(12) United States Patent
Bever

(10) Patent No.: US 7,775,026 B2
(45) Date of Patent: Aug. 17, 2010

(54) LAWN MOWER BLADE ASSEMBLY FOR QUICK BLADE REPLACEMENT AND ASSOCIATED METHODS

(76) Inventor: Christopher Bever, 23412 Valderama La., Sorrento, FL (US) 32776

( * ) Notice: Subject to any disclaimer, the term of this patent is extended or adjusted under 35 U.S.C. 154(b) by 0 days.

(21) Appl. No.: 12/137,911

(22) Filed: Jun. 12, 2008

(65) Prior Publication Data
US 2009/0308044 A1 Dec. 17, 2009

(51) Int. Cl.
*A01D 34/52* (2006.01)
*A01D 34/73* (2006.01)

(52) U.S. Cl. ...................................................... 56/255
(58) Field of Classification Search ................... 56/295, 56/255; 30/276, 347; D15/17, 28; 172/552
See application file for complete search history.

(56) References Cited

U.S. PATENT DOCUMENTS

| | | | | |
|---|---|---|---|---|
| 2,854,807 A * | 10/1958 | Byler et al. | ................... | 56/295 |
| 3,321,894 A * | 5/1967 | Ingram | ........................ | 56/295 |
| 3,545,189 A * | 12/1970 | Houle et al. | ................... | 56/295 |
| 3,563,015 A | 2/1971 | Renfroe | ........................ | 56/295 |
| 3,683,606 A * | 8/1972 | Staines | ........................ | 56/295 |
| 3,769,784 A * | 11/1973 | Jones | ........................ | 56/295 |
| 3,910,017 A * | 10/1975 | Thorud et al. | ................ | 56/295 |
| 4,083,166 A * | 4/1978 | Haas | ........................ | 56/13.7 |
| 4,229,933 A * | 10/1980 | Bernard | ........................ | 56/295 |
| 4,445,315 A * | 5/1984 | Roszkowski | ............... | 56/295 |
| 4,471,603 A * | 9/1984 | Veltin, Jr. | .................... | 56/295 |
| 4,484,560 A * | 11/1984 | Tanigawa | ..................... | 125/15 |
| 4,586,257 A | 5/1986 | Rittenhouse | ................. | 30/276 |
| 4,750,320 A | 6/1988 | Liebl | ........................... | 56/295 |
| 4,815,264 A * | 3/1989 | Mijnders | ..................... | 56/295 |
| 5,018,347 A | 5/1991 | Feilen | ......................... | 56/295 |
| 5,019,113 A | 5/1991 | Burnell | ....................... | 56/295 |
| 5,036,654 A | 8/1991 | Malutich | ..................... | 56/255 |
| 5,069,025 A * | 12/1991 | Iversen | ....................... | 56/295 |
| 5,103,882 A * | 4/1992 | Milbourn | .................. | 144/230 |
| 5,210,998 A * | 5/1993 | Hojo et al. | ................... | 56/255 |
| 5,619,847 A * | 4/1997 | Cox, Jr. | ....................... | 56/255 |
| 5,791,131 A | 8/1998 | Hill et al. | ...................... | 56/295 |
| 6,182,430 B1 | 2/2001 | Blarek et al. | .................. | 56/295 |
| 6,205,755 B1 | 3/2001 | Bontrager et al. | ............ | 56/17.5 |
| 6,367,235 B1 * | 4/2002 | Moynihan | .................... | 56/17.5 |
| 6,470,661 B1 * | 10/2002 | Plamper | ...................... | 56/17.5 |
| 6,688,095 B2 * | 2/2004 | Wadzinski | .................... | 56/255 |
| 6,935,095 B1 | 8/2005 | Sluder | ......................... | 56/295 |
| 2003/0182918 A1 | 10/2003 | Stone et al. | ................... | 56/255 |
| 2005/0210852 A1 | 9/2005 | Lancaster | .................... | 56/295 |

FOREIGN PATENT DOCUMENTS

FR 2823635 10/2002

* cited by examiner

*Primary Examiner*—Árpád Fábián-Kovács
(74) *Attorney, Agent, or Firm*—Allen, Dyer, Doppelt, Milbrath & Gilchrist, P.A.

(57) ABSTRACT

A lawn mower blade assembly for a rotatable driveshaft includes a blade mount to be secured to the rotatable driveshaft and a cutting blade removably coupled to the blade mount and defining therewith a blade base unit having at least one wedge surface thereon. At least one sliding retainer removably couples the cutting blade to the blade mount and is slidably movable between a locked position and a released position. The at least one sliding retainer has at least one wedge surface thereon cooperating with the at least one wedge surface of the blade base unit to securely couple the cutting blade to the blade mount when in the locked position.

15 Claims, 7 Drawing Sheets

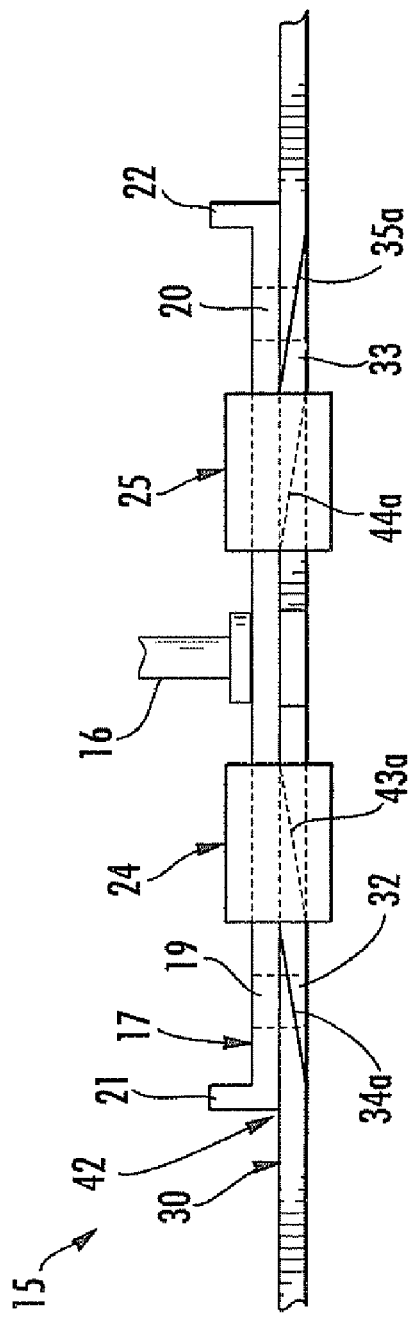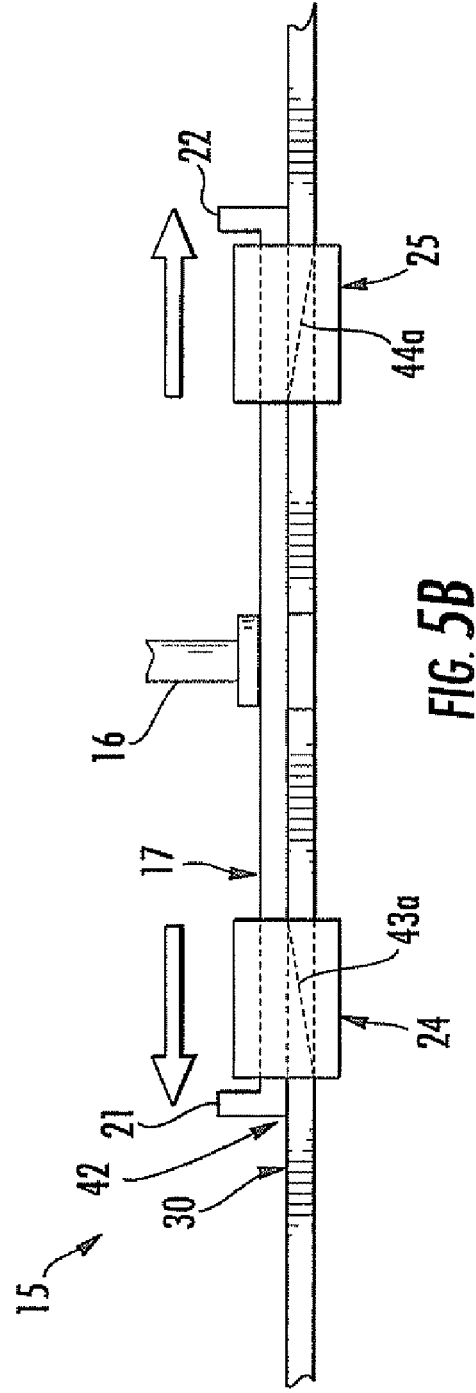

LAWN MOWER BLADE ASSEMBLY FOR QUICK BLADE REPLACEMENT AND ASSOCIATED METHODS

FIELD OF THE INVENTION

The present invention relates to the field of lawn mower blade assemblies, and, more particularly, to lawn mower blade assemblies that facilitate quick cutting blade replacement and related methods.

BACKGROUND OF THE INVENTION

Rotary lawn mowers are widely used by both homeowners and lawn service providers for cutting grass to maintain the tidy appearance of lawns located about residences and buildings. Such lawn mowers typically include an internal combustion engine or electric motor to rotate a driveshaft, and a cutting blade coupled to the driveshaft by a fastener. The cutting blade is therefore rotated, severing individual blades of grass it passes through the grass. The rotating cutting blade generates currents of air that may cause the blades of grass to be lifted upright as the lawn mower advances over the ground, helping to cut the blades of grass to an even length.

The cutting blade is subjected to potentially damaging operating conditions, often contacting sticks, rocks, tree roots, and other debris. Cutting blades wear and become dull over time, losing their ability to effectively cut grass. To replace a conventional cutting blade, an individual typically removes the fastener coupling the lawn mower blade to the rotatable driveshaft, which may be time consuming and difficult to accomplish. The removal and sharpening, or complete replacement of such cutting blades is particularly burdensome for lawn service providers who use fleets of such lawn mowers and cut large amounts of grass on a daily basis.

Some prior attempts at providing a lawn mower cutting blade that may be quickly sharpened or replaced focused on cutting blades having removable and replaceable cutting edges. For example, U.S. Pat. No. 3,563,015 to Renfroe discloses a cutting blade for a rotary lawn mower having detachable cutting edges that are slidably mounted in spaced apart channels on ends of the cutting blade. The cutting blade includes stops extending laterally of the cutting edges to prevent the longitudinal movement of the cutting edges outwardly of the cutting blade.

U.S. Pat. No. 5,018,347 to Feilen discloses an elongate lawn mower cutting blade including a forwardly extending flange and a rearwardly extending flange. Each flange includes a slot extending along the flange spaced apart from an edge end surface of the cutting blade. A replaceable cutting edge having a T-shaped projection extending rearwardly is receivable within the slot.

Other approaches to providing lawn mower cutting blades that may be quickly replaced focused on a blade mount for releasably securing a cutting blade to a lawn mower's rotatable driveshaft. U.S. Pat. No. 4,586,257 to Rittenhouse, for example, discloses such a blade mount for releasably securing a cutting blade to the rotatable drive shaft. The blade mount includes an engaging pin biased with a compression spring extending outwardly from the blade mount face against which the cutting blade rests. The engaging pin projects through a hole in the cutting blade and can be pushed in to release the cutting blade. The cutting blade and blade mount have respective notches and tabs that can be aligned to assist the securing of the cutting blade in the blade mount during use.

These prior approaches, however, may not facilitate cutting blade removal and sharpening, or replacement as easily and quickly as some users may desire. Accordingly, other types of lawn mower blade assemblies that enable quick cutting blade removal and sharpening, or replacement may be desired.

SUMMARY OF THE INVENTION

In view of the foregoing background, it is therefore an object of the present invention to provide a lawn mower blade assembly that facilitates cutting blade removal and sharpening, or replacement.

This and other objects, features, and advantages in accordance with the present invention are provided by a lawn mower blade assembly for a rotatable driveshaft that may comprise a blade mount to be secured to the rotatable driveshaft. A cutting blade may be removably coupled to the blade mount to define therewith a blade base unit having at least one wedge surface thereon. At least one sliding retainer may removably couple the cutting blade to the blade mount and may be slidably movable between a locked position and a released position. The at least one sliding retainer may have at least one wedge surface thereon cooperating with the at least one wedge surface of the blade base unit to securely couple the cutting blade to the blade mount when in the locked position.

Accordingly, a simple tap with a hammer on the at least one sliding retainer can secure the cutting blade and blade mount together. Centrifugal force maintains tight the engagement between the at least one wedge surface of the blade base unit and the at least one sliding retainer, making the coupling between the blade mount and the cutting blade particularly secure.

Additionally, the blade base unit may have at least one release notch therein. The sliding retainer when in the released position may be aligned with the at least one release notch to permit removal of the cutting blade from the blade mount. In other words, a simple tap with the hammer on the at least one sliding retainer in the reverse direction frees the sliding retainer to be moved in alignment with the release notch. Thus, this lawn mower blade assembly provides for quick and simple cutting blade removal and sharpening, or replacement, saving homeowners and lawn service providers time and money.

Furthermore, the blade mount may have a medial opening therein to receive a fastener for securing the blade mount to the rotatable driveshaft. The at least one sliding retainer may comprise a pair of sliding retainers on opposite sides of the medial opening of the blade mount. In addition, the cutting blade may have a medial opening therein larger than the medial opening in the blade mount and aligned therewith to receive the head of the fastener that secures the blade mount to the driveshaft.

The blade mount may have an elongate rectangular shape with a medial opening therein to receive the fastener for securing the blade mount to the rotatable driveshaft. Additionally, the cutting blade may have an elongate rectangular shape with a length greater than the blade mount.

The at least one wedge surface of the blade base unit may comprise at least one wedge surface on the cutting blade. Moreover, the at least one wedge surface on the cutting blade may comprise first and second pairs of wedge surfaces. Further, the at least one sliding retainer may comprise first and second sliding retainers and the at least one wedge surface on each of the first and second sliding retainers may comprise a pair thereof.

The blade mount and the cutting blade may each comprise respective portions defining at least one alignment feature therebetween. For example, the at least one alignment feature may comprise at least one guide pin and at least one guide pin opening cooperating therewith.

The blade mount may comprise a rectangular bar and at least one tab extending outwardly therefrom to capture the at least one sliding retainer on the rectangular bar. The at least one sliding retainer may comprise a band at least partially surrounding the blade mount and the cutting blade.

The cutting blade may also be usable without the blade mount. In these embodiments, the cutting blade may further comprise an adaptor having a body to be positioned in the medial opening. The body may have a fastener receiving passageway therein. A flange may be carried by said body and may have a width greater than the medial opening. The adaptor permits the cutting blade to be used by itself and with a conventional fastener directly secured to the driveshaft.

Another aspect is directed to a method for removably coupling a cutting blade to a lawn mower. The method may comprise securing a blade mount to a rotatable driveshaft of the lawn mower and positioning the cutting blade adjacent the blade mount and defining therewith a blade base unit having at least one wedge surface thereon. Furthermore, the method may comprise slidably moving at least one sliding retainer from a released position to a locked position and with the at least one sliding retainer having at least one wedge surface thereon cooperating with the at least one wedge surface of the blade base unit to securely couple the cutting blade to the blade mount when in the locked position.

BRIEF DESCRIPTION OF THE DRAWINGS

FIG. 5A is a side view of the lawn mower blade assembly of FIG. 1 when the sliding retainers are in the released position.

FIG. 5B is a side view of the lawn mower blade assembly of FIG. 1 when the sliding retainers are in the locked position.

DETAILED DESCRIPTION OF THE PREFERRED EMBODIMENTS

Figure 1:
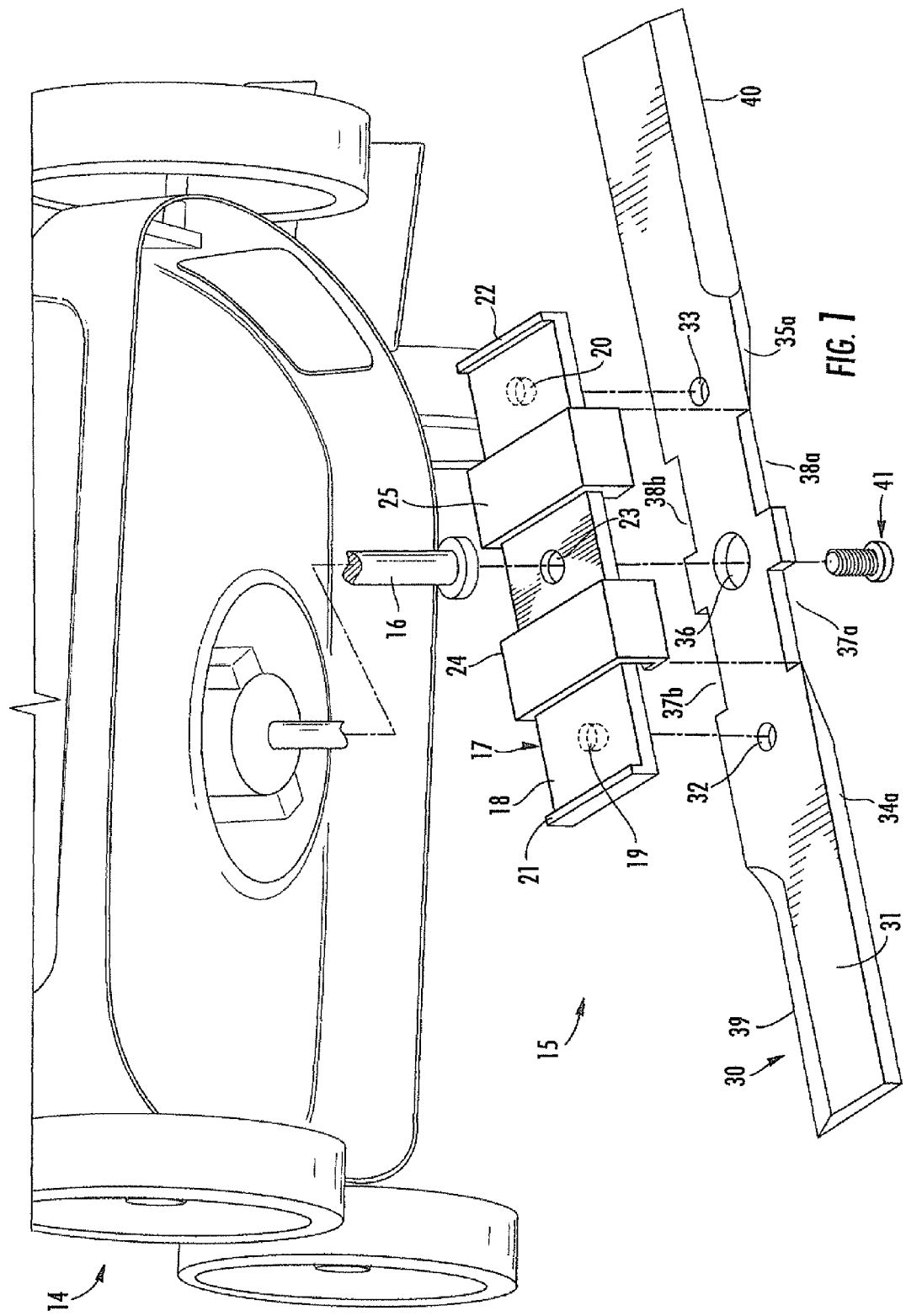
FIG. 1 is an exploded perspective view of a lawn mower blade assembly in accordance with the present invention shown on the underside of a lawn mower.
Figure 2:
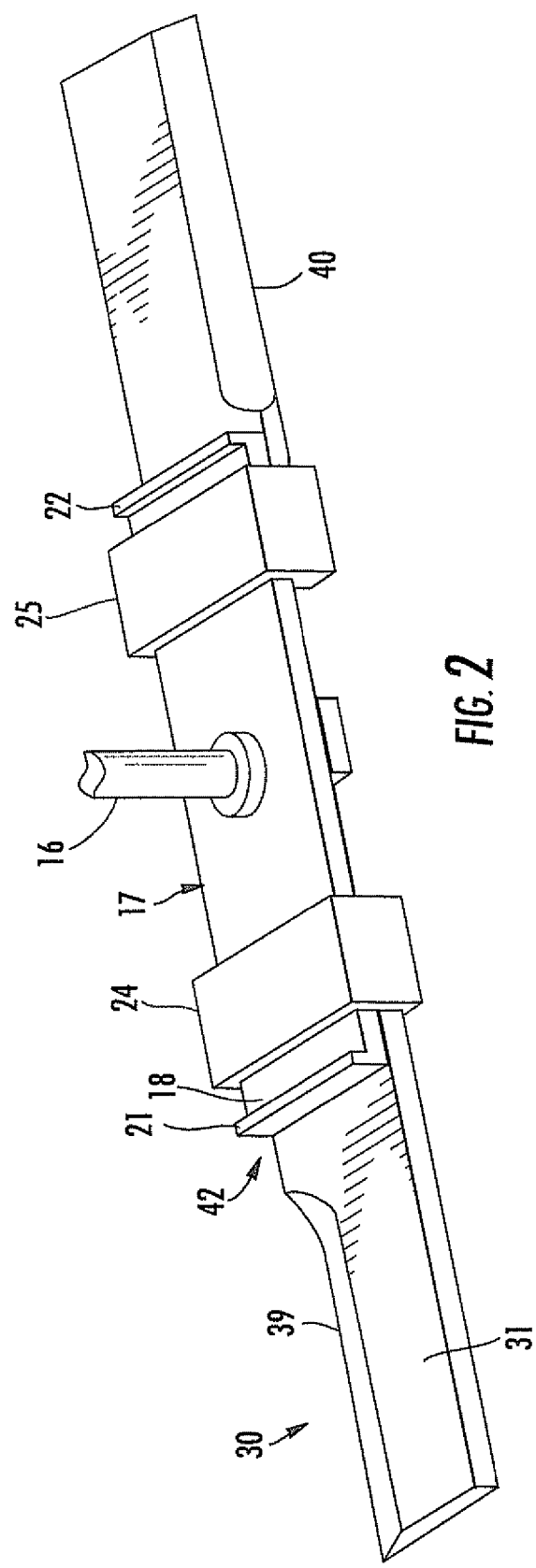
FIG. 2 is a perspective top view of the lawn mower blade assembly of FIG. 1.
Figure 3:
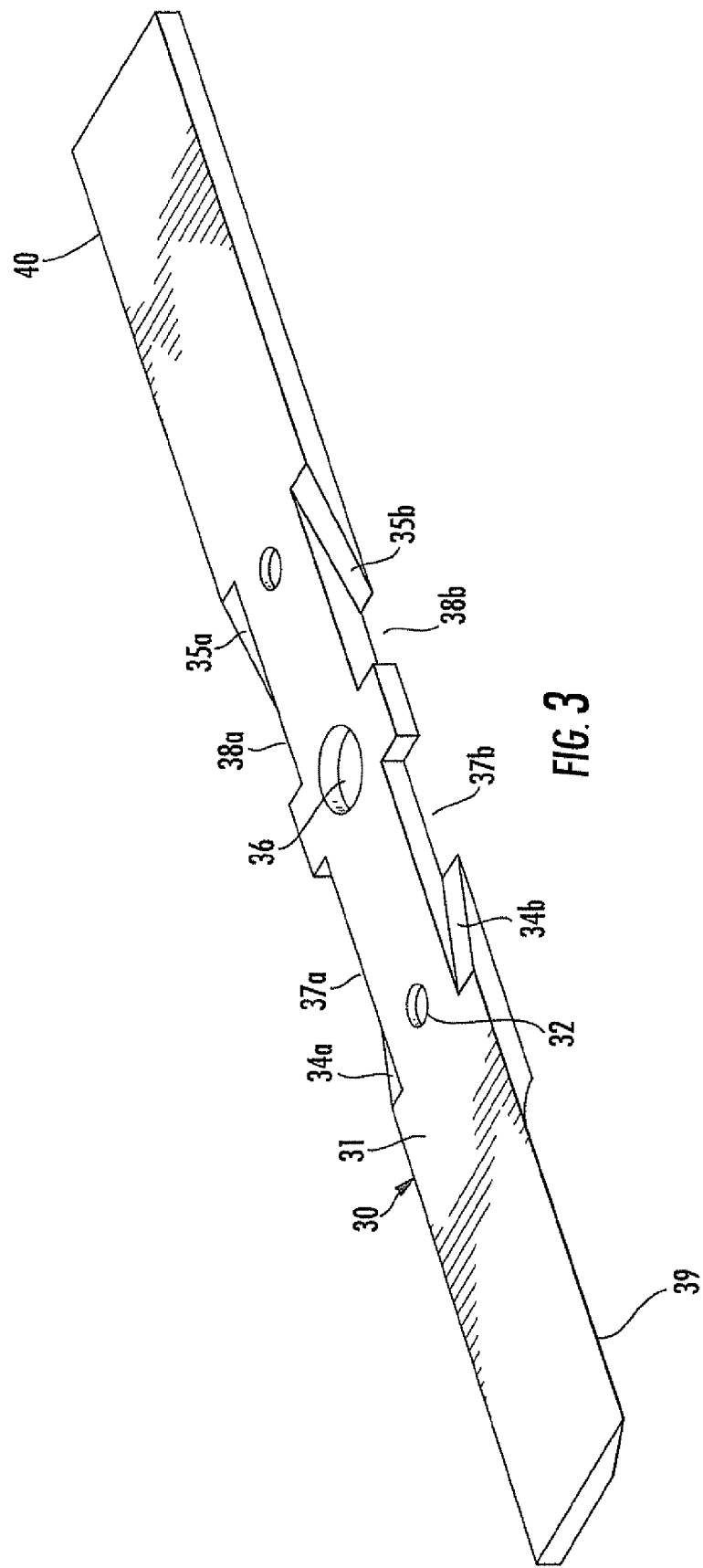
FIG. 3 is a perspective top view of the cutting blade of FIG. 1.
Figure 4:
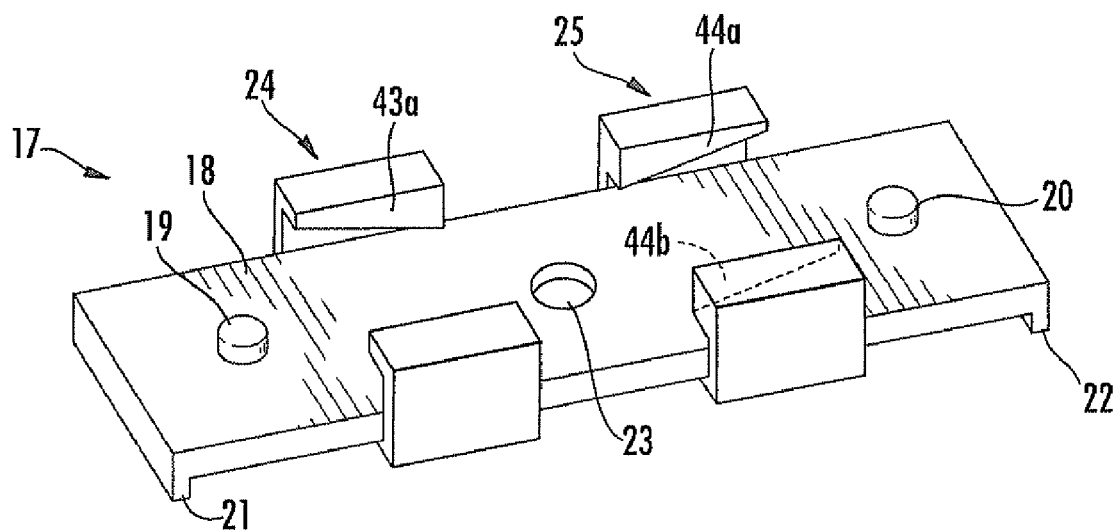
FIG. 4 is a perspective bottom view of the blade mount of FIG. 1.
Figure 6:
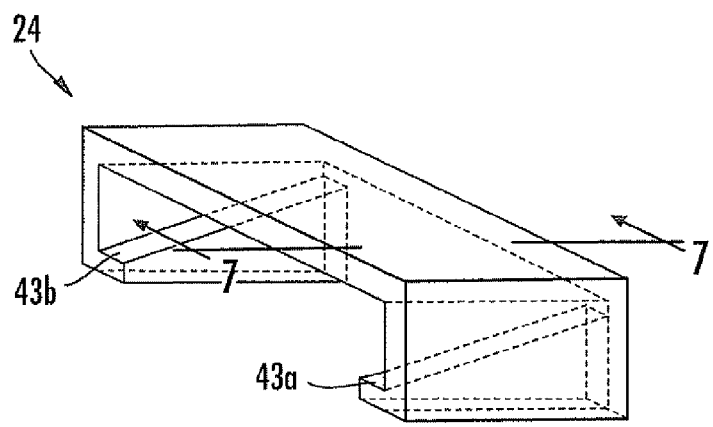
FIG. 6 is a perspective side view of a sliding retainer of FIG. 1.
Figure 7:
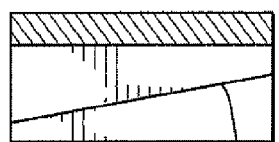
FIG. 7 is a cross sectional view of the sliding retainer of FIG. 6 taken along line 7-7.
Figure 8:
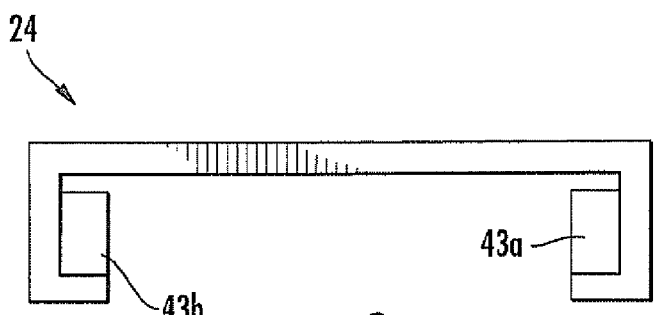
FIG. 8 is a front elevational view of the sliding retainer of FIG. 6.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-8, a first embodiment of a lawn mower blade assembly 15 for a rotatable driveshaft 16 of a lawn mower 14 is now described. The lawn mower blade assembly 15 comprises a blade mount 17 to be secured to the rotatable driveshaft 16. A cutting blade 30 having a pair of cutting edges 39, 40 on opposite sides and adjacent opposite ends of the cutting blade is removably coupled to the blade mount 17 and defines therewith a blade base unit 42. The blade base unit 42 has two pairs of wedge surfaces thereon 34a, 34b and 35a, 35b. In the illustrated embodiment, the wedge surfaces 34a, 34b and 35a, 35b of the blade base unit 42 are on the cutting blade 30. The wedge surfaces 34a, 34b and 35a, 35b of the cutting blade 30 are perhaps best shown FIG. 3. It should be noted that the wedge surfaces 34a, 34b and 35a, 35b of the blade base unit 42 may alternatively be on the blade mount 17, as will be appreciated by those of skill in the art.

Although two pairs of wedge surfaces 34a, 34b and 35a, 35b are shown on the cutting blade 30, it is to be understood that there may be a greater number of wedge surfaces or a lesser number of wedge surfaces. In addition, although the cutting blade 30 illustratively has two cutting edges 39, 40 the cutting blade may alternatively have other numbers of cutting edges. Further, the cutting edges 39, 40 may be on any suitable location of the cutting blade 30.

A pair of sliding retainers 24, 25 each comprising a band partially surrounding the blade mount 17, removably couple the cutting blade 30 to the blade mount and are slidably movable between a locked position (FIG. 5b) and a released position (FIG. 5a). The sliding retainers 24, 25 are illustratively shown in the locked position in FIG. 2, and are likewise depicted in the released position in FIG. 1. As perhaps best shown in FIG. 6, the sliding retainers 24, 25 each have a pair of wedge surfaces 43a, 43b and 44a, 44b thereon that cooperate with the wedge surfaces 34a, 34b and 35a, 35b of the cutting blade 30 to securely couple the cutting blade to the blade mount 17 when in the locked position.

The wedge surfaces 43a, 43b of the sliding retainer 24 and the wedge surfaces 34a, 34b of the cutting blade 30 are each at a same angle. Likewise, the wedge surfaces 44a, 44b of the sliding retainer 25 and the wedge surfaces 35a, 35b of the cutting blade 30 are each at a same angle. The angles may be in a range of 5 to 85 degrees from the major lower surface of the cutting blade 30, for example.

As the lawn mower blade assembly 15 rotates, centrifugal force urges the sliding retainers 24, 25 outward. As the sliding retainers 24, 25 are urged outward, the wedge surfaces 43a, 43b and 44a, 44b of the sliding retainers and the wedge surfaces 34a, 34b and 35a, 35b of the cutting blade 30 are maintained in tight engagement. This in turn forces the cutting blade 30 and the blade mount 17 together, maintaining a tight engagement and providing a secure coupling. Those of skill in the art will appreciate that, in other embodiments, other numbers of sliding retainers 24, 25 may be used. Moreover, such sliding retainers 24, 25 need not each have a pair of wedge surfaces 43a, 43b and 44a, 44b but may have other numbers of wedge surfaces.

The blade base unit 42 has two pairs of release notches 37a, 37b and 38a, 38b opposite the midpoint of the blade base unit therein to facilitate removal of the cutting blade 30 from the blade mount 17 when the sliding retainers 24, 25 are in the released position. The release notches 37a, 37b and 38a, 38b of the blade base unit 42 are illustratively in the cutting blade 30, although it is to be understood that in other embodiments the release notches may be in the blade mount 17 if the sliding retainers 24, 25 are retained on the cutting blade 30. Those of skill in the art will appreciate that there may be other numbers of release notches 37a, 37b and 38a, 38b and, further, that the blade mount 17 and cutting blade 30 may have other release features instead of release notches.

This lawn mower blade assembly 15 provides for quick and simple cutting blade removal, saving homeowners and lawn service providers time and money. A simple tap with a hammer on the sliding retainers 24, 25 can secure the cutting blade 30 to the blade mount 17. Likewise, another simple tap with the hammer on the sliding retainers 24, 25 in the reverse position frees the sliding retainers to be moved in alignment with the release notches 37a, 37b and 38a, 38b. The time spent changing conventional cutting blades on a fleet of lawn mowers may be substantial and the cost to pay technicians to perform that work may be substantial, therefore lawn service providers will particularly appreciate the lawn mower blade assembly 15 in accordance with the invention. Similarly, changing a conventional cutting blade may perhaps be too difficult or time consuming for a homeowner to accomplish, causing the homeowner to bring the lawn mower to a service center to have the cutting blade changed at a cost.

The blade mount 17 illustratively comprises an elongate rectangular bar 18, and the cutting blade 30 comprises an elongate rectangular bar 31 which has a length greater than that of the blade mount. A pair of tabs 21, 22 extends outwardly from the rectangular bar 18 to capture the sliding retainers 24, 25 thereon. It is to be understood that the blade mount 17 and the cutting blade 30 may alternatively have different shapes as well.

The blade mount 17 has a medial opening 23 therein to receive a fastener 41 for securing the blade mount to the rotatable driveshaft 16. In other embodiments, the opening 23 may be located in different portions of the blade mount 17. It should be noted that the blade mount 17 may, alternatively, be indirectly coupled to the rotatable driveshaft 16. For example, the blade mount 17 may be coupled to a structure that is directly secured to the rotatable driveshaft 16, such as a disc. The coupling between the blade mount 17 and such a structure may be a rotatable coupling which leaves the blade mount 17 free to at least partially rotate around the axis of the coupling.

The cutting blade 30 has a medial opening 36 defined therein which is larger than the medial opening 23 of the blade mount 17 and is aligned therewith to allow easy access to the fastener 41 when coupled to the blade mount. The opening 36 may be located in different portions of the cutting blade 30, as will be apparent to those of skill in the art. The medial openings 23, 36 are illustratively circular, but may take rectangular, hexagonal, or other suitable shapes in other embodiments as will be understood by those of skill in the art.

The blade mount 17 illustratively has a pair of guide pins 19, 20 on opposite sites of the medial opening 23 and the cutting blade 30 has a corresponding pair of guide pin openings 32, 33 on opposite sides of the medial opening 36 that cooperate with the guide pins to properly align the blade mount and the cutting blade. The cooperation between the guide pins 19, 20 and guide pin openings 32, 33 is perhaps best shown in FIG. 5A. The blade mount 17 and cutting blade 30 may alternatively have other numbers of guide pins 19, 20 and guide pin openings 32, 33 or may have no guide pins and guide pin openings. Furthermore, the cutting blade 30 may have guide pin openings 32, 33 while the blade mount 17 lacks guide pins 19, 20. Although not shown in the figures, it is to be understood that in some embodiments, the cutting blade 30 may have the guide pins 19, 20 while the blade mount 17 has the guide pin openings 32, 33 therein. Those of skill in the art will appreciate that the blade mount 17 and the cutting blade 30 may each have other alignment features instead of the guide pins 19, 20 and guide pin openings 32, 33.

Figure 9:
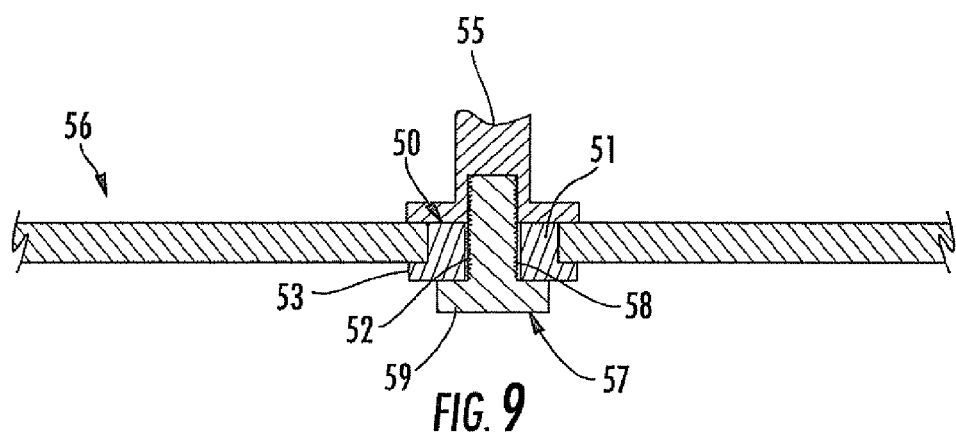
FIG. 9 is a cross sectional view of an embodiment of a cutting blade and adaptor in accordance with the present invention.

Referring now additionally to FIG. 9, in an alternative embodiment, the cutting blade 56 itself may be coupled to the rotatable driveshaft 55. This cutting blade 56 may have any or all of the features of the cutting blade 30 of the lawn mower blade assembly 15 shown in FIGS. 1-3. The cutting blade 56 has a medial opening 58 therein. An adaptor 50 is used to facilitate the coupling of the cutting blade 56 to the rotatable driveshaft 55 with a fastener 57. The adaptor 50 is particularly helpful because the medial opening 58 may be larger than the head 59 of the fastener 57. The use of the adaptor enables the fastener 57 to couple the cutting blade 56 to the rotatable driveshaft 55 in this situation. The adaptor 50 illustratively comprises a tubular body 51 that is positioned in the medial opening 58 and has a fastener receiving passageway 52 therein. A flange 53 is carried by the body and has a width greater than the medial opening 58 so that it supports the cutting blade 56 when coupled to the rotatable driveshaft 55. The adaptor 50 is illustratively constructed from metal, although it may also be constructed from other suitable materials such as rubber or plastic.

Figure 10:
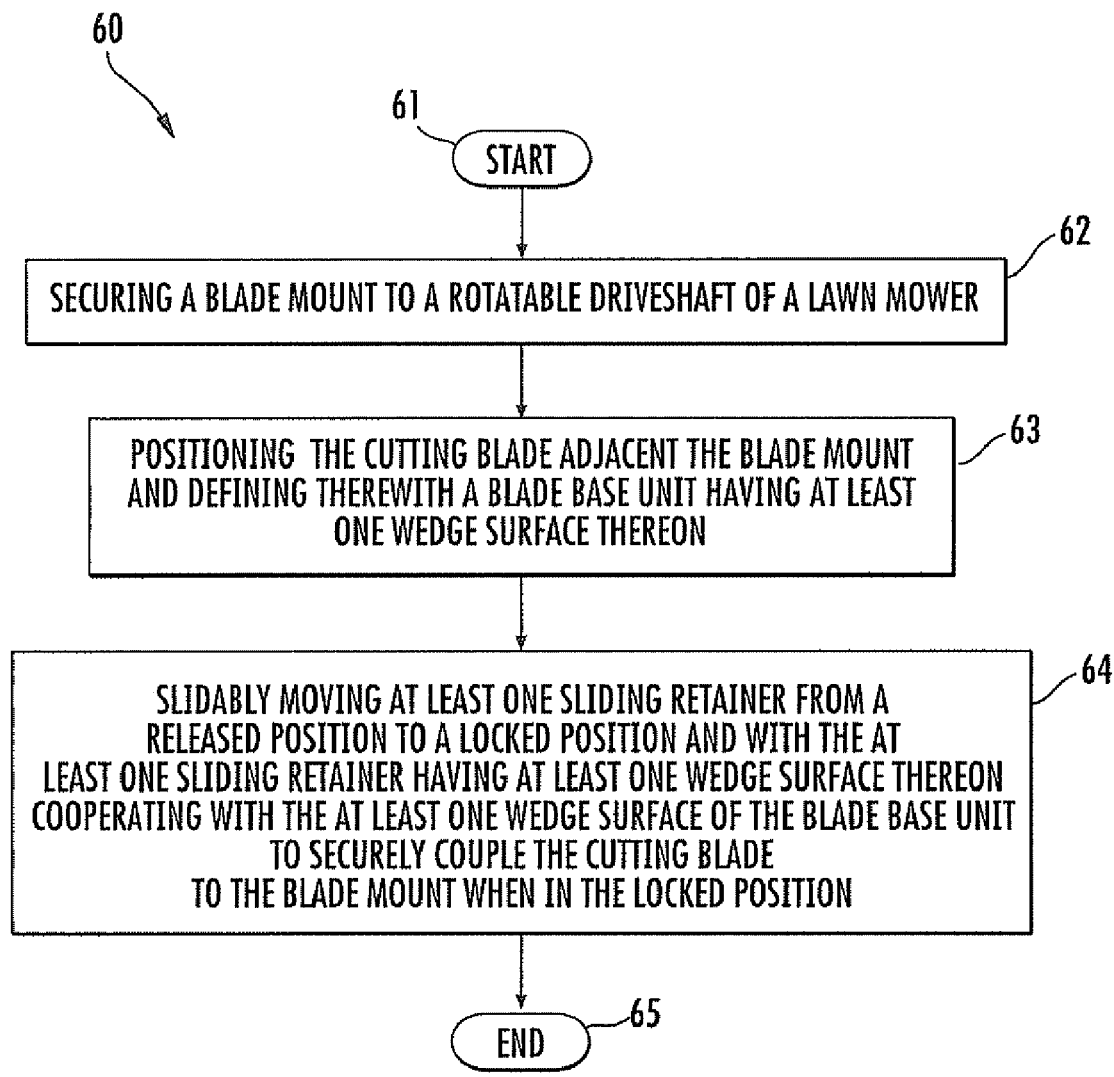
FIG. 10 is a flowchart of a method in accordance with the present invention.

With additional reference to the flowchart 60 FIG. 10, an aspect is directed to a method for removably coupling the cutting blade 30 to the lawn mower 14 is now described. After the start (at Block 61), at Block 62 the blade mount 17 is secured to a rotatable driveshaft 16 of the lawn mower 14. At Block 63, the cutting blade 30 is positioned adjacent the blade mount 17 and defines therewith a blade base unit 42 having at least one wedge surface 34a, 34b, 35a, 35b thereon. At Block 64, at least one sliding retainer 24, 25 is slidably moved from a released position to a locked position with the at least one sliding retainer 24, 25 having at least one wedge surface 43a, 43b, 44a, 44b thereon cooperating with the at least one wedge surface 34a, 34b, 35a, 35b of the blade base unit 42 to securely couple the cutting blade 30 to the blade mount 17 when in the locked position. It will be noted by those of skill in the art that cutting blade removal and sharpening or replacement pursuant to this method may be quicker and simpler than with other methods of cutting blade removal and sharpening or replacement.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A lawn mower blade assembly for a rotatable driveshaft comprising:
   a blade mount to be secured to the rotatable driveshaft and having an elongate rectangular shape with a medial opening therein to receive a fastener for securing the blade mount to the rotatable driveshaft;
   a cutting blade removably coupled to said blade mount and defining therewith a blade base unit having first and second wedge surfaces thereon;
   said cutting blade comprising an elongate rectangular member having first and second opposing ends and first and second opposing sides, a length of the first and second sides being greater than a length of the first and second ends;

said elongate rectangular member having a medial opening therein aligned with the medial opening of the blade mount, and first and second release notches on respective portions of said elongate rectangular member opposite the medial opening;

said elongate rectangular member also having a first cutting edge on the first side and adjacent the first end, and a second cutting edge on the second side and adjacent the second end; and a pair of sliding retainers on respective portions of said blade mount opposite the medial opening and removably coupling said cutting blade to said blade mount and being slidably movable, with respect to the cutting blade and the blade mount, between a locked position and a released position, said pair of sliding retainers, when in the released position, being aligned with the pair of release notches to permit removal of said cutting blade from said blade mount;

each sliding retainer having at least one wedge surface thereon cooperating with a respective one of the first and second wedge surfaces of said blade base unit to securely couple said cutting blade to said blade mount when in the locked position.

2. The lawn mower blade assembly according to claim 1 wherein said blade mount has first and second release notches therein; and wherein said pair of sliding retainers when in the released position are aligned with the first and second release notches to permit removal of said cutting blade from said blade mount.

3. The lawn mower blade assembly according to claim 1 wherein the medial opening of said blade mount is to receive a fastener for securing said blade mount to the rotatable driveshaft.

4. The lawn mower blade assembly according to claim 1 wherein the medial opening in said cutting blade is larger than the medial opening in said blade mount.

5. The lawn mower blade assembly according to claim 1 wherein said elongate rectangular member has a length greater than said blade mount.

6. The lawn mower blade assembly according to claim 1 wherein the first and second wedge surfaces of said blade base unit comprises first and second wedge surfaces on said cutting blade.

7. The lawn mower blade assembly according to claim 6 wherein the first and second wedge surfaces on said cutting blade comprise first and second pairs of wedge surfaces.

8. The lawn mower blade assembly according to claim 1 wherein said blade mount and said cutting blade each comprises respective portions defining at least one alignment feature therebetween.

9. The lawn mower blade assembly according to claim 8 wherein said at least one alignment feature comprises at least one guide pin and at least one guide pin opening cooperating therewith.

10. The lawn mower blade assembly according to claim 1 wherein said blade mount comprises a rectangular bar and at least one tab extending outwardly therefrom to capture said at least one sliding retainer on said rectangular bar.

11. The lawn mower blade assembly according to claim 1 wherein said pair of sliding retainers each comprise a band at least partially surrounding said blade mount and said cutting blade.

12. A method for removably coupling a cutting blade to a lawn mower comprising:

securing a blade mount having first and second wedge surfaces thereon to a rotatable driveshaft of the lawn mower, the blade mount having an elongate rectangular shape;

positioning the cutting blade adjacent the blade mount and defining therewith a blade base unit having first and second wedge surfaces thereon, the cutting blade comprising an elongate rectangular member having first and second opposing ends and first and second opposing sides, a length of the first and second sides being greater than a length of the first and second ends, the elongate rectangular member having a medial opening therein aligned with the medial opening of the blade mount, and first and second release notches on respective portions of the elongate rectangular member opposite the medial opening, and the elongate rectangular member also having a first cutting edge on the first side and adjacent the first end, and a second cutting edge on the second side and adjacent the second end; and slidably moving a pair of sliding retainers on respective portions of the blade mount opposite the medial opening, with respect to the cutting blade and the blade mount, from a released position to a locked position and with each sliding retainer having at least one wedge surface thereon cooperating with a respective one of the first and second wedge surfaces of the blade base unit to securely couple the cutting blade to the blade mount when in the locked position, the pair of sliding retainers, when in the released position, being aligned with the pair of release notches to permit removal of the cutting blade from the blade mount.

13. The method according to claim 12 wherein the blade mount has first and second release notches therein; and wherein the pair of sliding retainers when in the released position are aligned with the first and second release notches to permit removal of the cutting blade from the blade mount.

14. The method according to claim 12 wherein the first and second wedge surfaces of the blade base unit comprises first and second wedge surfaces on the cutting blade.

15. The method according to claim 14 wherein the first and second wedge surfaces on the cutting blade comprises first and second pairs of wedge surfaces.

* * * * *